(12) United States Patent
Asari et al.

(10) Patent No.: US 8,090,148 B2
(45) Date of Patent: Jan. 3, 2012

(54) IMAGE PROCESSOR, VEHICLE, AND IMAGE PROCESSING METHOD

(75) Inventors: Keisuke Asari, Katano (JP); Yohei Ishii, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 1016 days.

(21) Appl. No.: 12/018,306

(22) Filed: Jan. 23, 2008

(65) Prior Publication Data

US 2008/0175436 A1 Jul. 24, 2008

(30) Foreign Application Priority Data

Jan. 24, 2007 (JP) .................. 2007-014161

(51) Int. Cl.
*G06K 9/00* (2006.01)

(52) U.S. Cl. .................. 382/103; 382/100; 382/104

(58) Field of Classification Search .................. 382/100, 382/103, 104

See application file for complete search history.

(56) References Cited

U.S. PATENT DOCUMENTS

| | | | | |
|---|---|---|---|---|
| 5,530,771 A | * | 6/1996 | Maekawa | 382/103 |
| 5,555,312 A | * | 9/1996 | Shima et al. | 382/104 |
| 6,370,261 B1 | * | 4/2002 | Hanawa | 382/104 |
| 7,640,107 B2 | * | 12/2009 | Shimizu et al. | 701/216 |
| 2009/0316955 A1 | * | 12/2009 | Takeuchi | 382/103 |

FOREIGN PATENT DOCUMENTS

| JP | 2002-083285 | | 3/2002 |
|---|---|---|---|
| JP | 2002083285 | * | 3/2002 |

* cited by examiner

*Primary Examiner* — Stephen Koziol
(74) *Attorney, Agent, or Firm* — Marvin A. Motsenbocker; Motslaw, PLLC

(57) ABSTRACT

An image processor includes an acquisition unit configured to acquire a camera image captured by a camera provided on a vehicle, a first image converter configured to project the camera image onto a flat surface to convert the camera image into a flat surface projection image, and a second image converter configured to project the camera image onto a curved surface to convert the camera image into a curved surface projection image. The first image converter converts a first image region having a predetermined width within the camera image into the flat surface projection image, and the second image converter converts a second image region outside the first image region in a width direction, within the camera image, into the curved surface projection image.

7 Claims, 10 Drawing Sheets

LEFT CAMERA IMAGE  RIGHT CAMERA IMAGE

FLAT SURFACE PROJECTION

CYLINDRICAL SURFACE PROJECTION

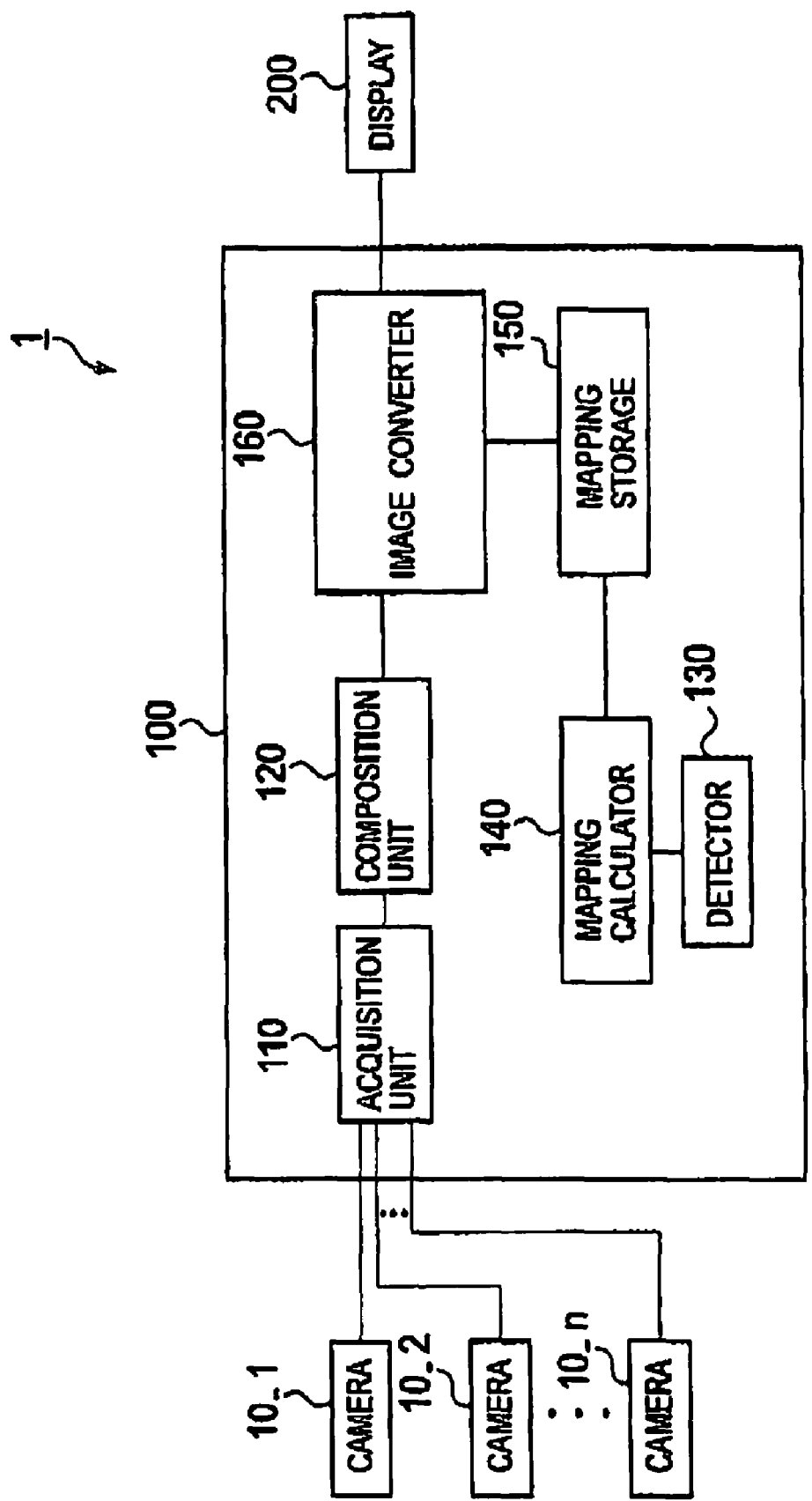

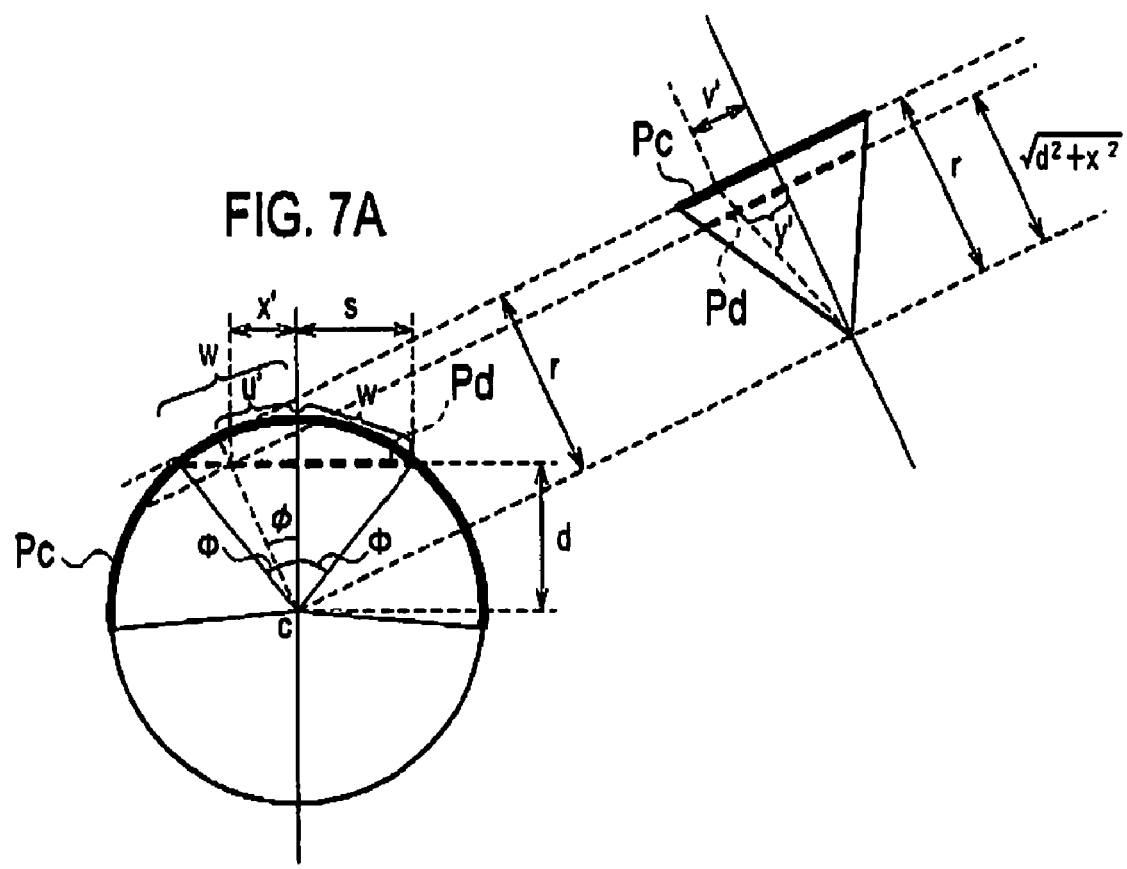

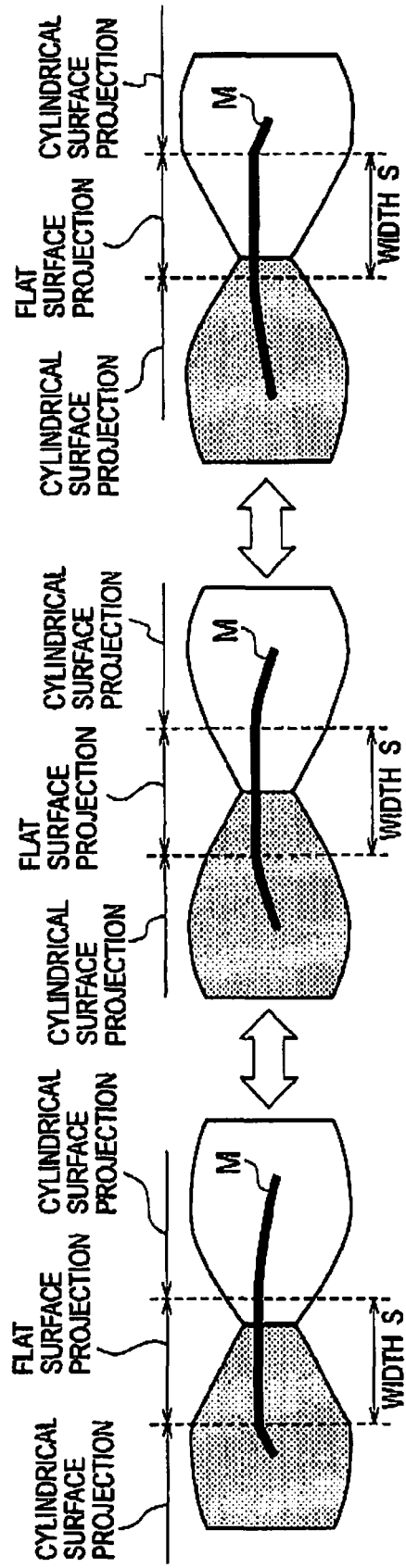

IMAGE PROCESSOR, VEHICLE, AND IMAGE PROCESSING METHOD

CROSS REFERENCE TO RELATED APPLICATIONS

This application is based upon and claims the benefit of priority from prior Japanese Patent Application No. 2007-014161, filed on Jan. 24, 2007; the entire contents of which are incorporated herein by reference.

BACKGROUND OF THE INVENTION

1. Field of the Invention

The present invention relates to an image processor, a vehicle and an image processing method for converting a camera image captured by a camera provided on the vehicle into a projection image for display.

2. Description of the Related Art

Conventionally, driving assistance systems have been proposed in order to allow a driver of a vehicle such as an automobile to check a situation around the vehicle. In such a driving assistance system, a camera captures a region around a vehicle and captured image is displayed on an in-vehicle display.

FIG. 1 shows an example of a driving assistance system including cameras 10_1 and 10_2 provided on a vehicle. In the driving assistance system, the camera 10_1 takes an image of a target region L to capture a left camera image PL, and the camera 10_2 takes images of a target region R to capture a right camera image PR. The driving assistance system is configured to cause an in-vehicle display to display the captured camera images PL and PR.

In such a driving assistance system, a panoramic composition is used as a technique for compositing images captured by a plurality of cameras to generate an image in the wide field of view. The above-described panoramic composition is a technique for generating a composite image by first projecting a plurality of camera images onto a common flat surface or a common cylindrical surface, and then compositing the projected images. Meanwhile, in recent years, a panoramic composition using a cylindrical surface and a spherical surface in combination has been proposed (e.g., Japanese Patent Publication No. 2002-83285).

Note that, in the case of the above-described panoramic composition in which a plurality of captured images are combined while being projected and onto a flat surface, the resultant composite image is partially enlarged in a manner that the closer to the left and right end, the more greatly the image is enlarged, as shown in FIG. 2A. Thus, such a composite image has a problem that the driver has a difficulty in checking the safety around the vehicle in a wide field of view, by using the composite image.

Instead, in the case where a plurality captured images are combined while being projected onto a cylindrical surface, the composite image has advantages that the image can be projected in a wide field of view without having the left and right ends enlarged, as shown in FIG. 2B. However, such a composite image is distorted as a whole, so that an object M located around the vehicle is displayed as a distorted object. Consequently, such a composite image has a problem that the driver has a difficulty in figuring out how far an object is from the vehicle by using the composite image, particularly for an object existing in the traveling direction of the vehicle.

In the panoramic composition disclosed in Japanese Patent Publication No. 2002-83285, in projecting captured images, an image far from a vehicle is projected on a cylindrical surface and an image near the vehicle is projected on a spherical surface, whereby a composite image is generated. The image near the vehicle, projected on the spherical surface makes it comparatively easy for the driver to figure out a distance between an object and the vehicle. However, since the image far from the vehicle, projected on the cylindrical surface is distorted, the driver has a difficulty in figuring out a distance between an object and the vehicle by using the image.

That is, although a composite image obtained by projecting captured images on a cylindrical surface, a spherical surface or the like is capable of showing an image in a wide field of view, the composite image is quite unlike an image directly viewed by the driver of a vehicle with the eyes. Accordingly such a composite image has a problem of poor visibility because the driver has a difficulty in figuring out a distance between an object and the vehicle by using the image.

SUMMARY OF THE INVENTION

An image processor according to a first aspect of the present invention includes: an acquisition unit (acquisition unit 110), a first image converter (image converter 160), and a second image converter (image converter 160). The acquisition unit is configured to acquire a camera image captured by a camera (e.g., a camera 10_1) provided on a vehicle. The first image converter is configured to project the camera image onto a flat surface to convert the camera image into a flat surface projection image. The second image converter is configured to project the camera image onto a curved surface to convert the camera image into a curved surface projection image (e.g., a cylindrical surface projection image). Specifically, the first image converter converts a first image region (a flat surface projection region) having a predetermined width (a flat surface projection width) within the camera image into the flat surface projection image. The second image converter converts a second image region (cylindrical surface projection regions) which is region outside the first image region in a width direction, within the camera image, into the curved surface projection image.

According to this aspect, the image processor converts the first image region having a predetermined width within the camera image into the flat surface projection image, and converts the second image region into the curved surface projection image. Therefore, for example, when the image processor causes a display to display an image converted by the image processor, the converted displayed image has together a flat surface projection image which is close to an image viewed by the diver with eyes, and a curved surface projection image in a wide field of view. As described above, according to this aspect, the image processor is capable of providing a converted display image in a wide field of view while preventing a degradation of visibility of the display image.

The image processor according to the first aspect of the present invention further includes a composition unit. The acquisition unit acquires a plurality of the camera images (e.g., camera images PRa and PLa). The composition unit (composition unit 120) is configured to combine the plurality of camera images and to generate a composite image. The first image converter converts the first image region within the composite image into the flat surface projection image. The second image converter converts the second image region within the composite image into the curved surface projection image.

In the image processor according to the first aspect of the present invention, the predetermined width corresponds to the width of the vehicle.

According to the first aspect of the present invention, the image processor further includes a detector (detector 130) configured to detect a traveling direction of the vehicle. The first image converter shifts a position of the first image region within the camera image in a width direction in accordance with a detected traveling direction.

According to the first aspect of the present invention, the image processor further includes a setting unit (mapping calculator 140) configured to set the predetermined width. The first image converter converts the first image region into the flat surface projection image in accordance with the predetermined width set by the setting unit.

A vehicle according to a second aspect of the present invention includes a camera and an image processor. The image processor includes an acquisition unit, a first image converter, and a second image converter. The acquisition unit is configured to acquire a camera image captured by the camera. The first image converter is configured to project the camera image onto flat surface to convert the camera image into a flat surface projection image. The second image converter is configured to project the camera image onto a curved surface to convert the camera image into a curved surface projection image. The first image converter converts a first image region having a predetermined width within the camera image into the flat surface projection image. The second image converter converts a second image region which is region outside the first image region in a width direction, within the camera image, into the curved surface projection image.

An image processing method according to the third aspect of the present invention includes an acquisition step, a first image converting step, a second image converting step. In the acquisition step, a camera image captured by a camera provided on a vehicle is acquired. In the first image converting step, the camera image is projected onto a flat surface so that the camera image is converted into a flat surface projection image. In the second image converting step, the camera image is projected onto a curved surface so that the camera image is converted into a curved surface projection image. In the first image converting step, a first image region having a predetermined width within the camera image is converted into the flat surface projection image. In the second converting step, second image regions that are regions outside the first image region in a width direction within the camera image are converted into the curved surface projection images.

BRIEF DESCRIPTION OF THE DRAWINGS

FIG. 4 is a schematic view showing an entire configuration of the driving assistance system according to the embodiment of the present invention.

FIG. 7A is a cross-sectional image view of a composite image Pc and a flat surface projection image Pd taken along a plane perpendicular to the central axis of a cylindrical surface in the embodiment of the present invention. FIG. 7B is a cross-sectional image view showing an image of sections of the composite image Pc and the flat surface projection image Pd taken along a plane which intersects with the central axis of the cylindrical surface in the embodiment of the present invention.

FIG. 10A is a view showing a conversion projection image at the time when the vehicle turns left turn in the embodiment of the present invention. FIG. 10B is a view showing a conversion projection image at the time when the vehicle travels straight in the embodiment of the present invention. FIG. 10C is a view showing a conversion projection image at the time when the vehicle turns right in the embodiment of the present invention.

DETAILED DESCRIPTION OF THE PREFERRED EMBODIMENTS

First Embodiment

Figure 1:
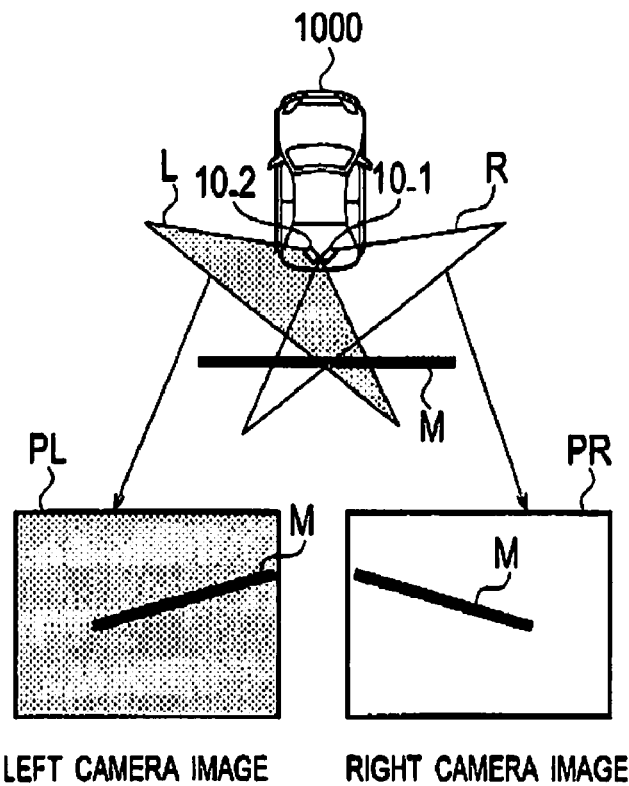
FIG. 1 is a conceptual diagram showing that a plurality of cameras take images of regions around a vehicle and capture a camera image, in a driving assistance system according to the related art or according to an embodiment of the present invention.
Figure 2A:
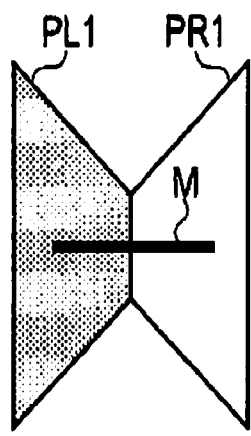
FIG. 2A is a view showing an example of a projection image obtained by projecting a plurality of camera images onto a flat surface, in the driving assistance system according to the related art.
Figure 2B:
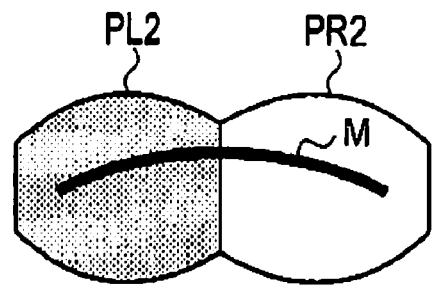
FIG. 2B is a view showing an example of a projection image obtained by projecting a plurality of camera images onto a cylindrical surface, in the driving assistance system according to the related art.

A first embodiment of the present invention will be described. The same or similar reference numerals are given to denote the same or similar portions in the following drawings. However, it should be noted that drawings are only schematic.

(Configuration of Driving Assistance System)

Hereinafter, a configuration of a driving assistance system according to a first embodiment of the present invention will be described with reference to FIGS. 3 and 4.

Figure 3:
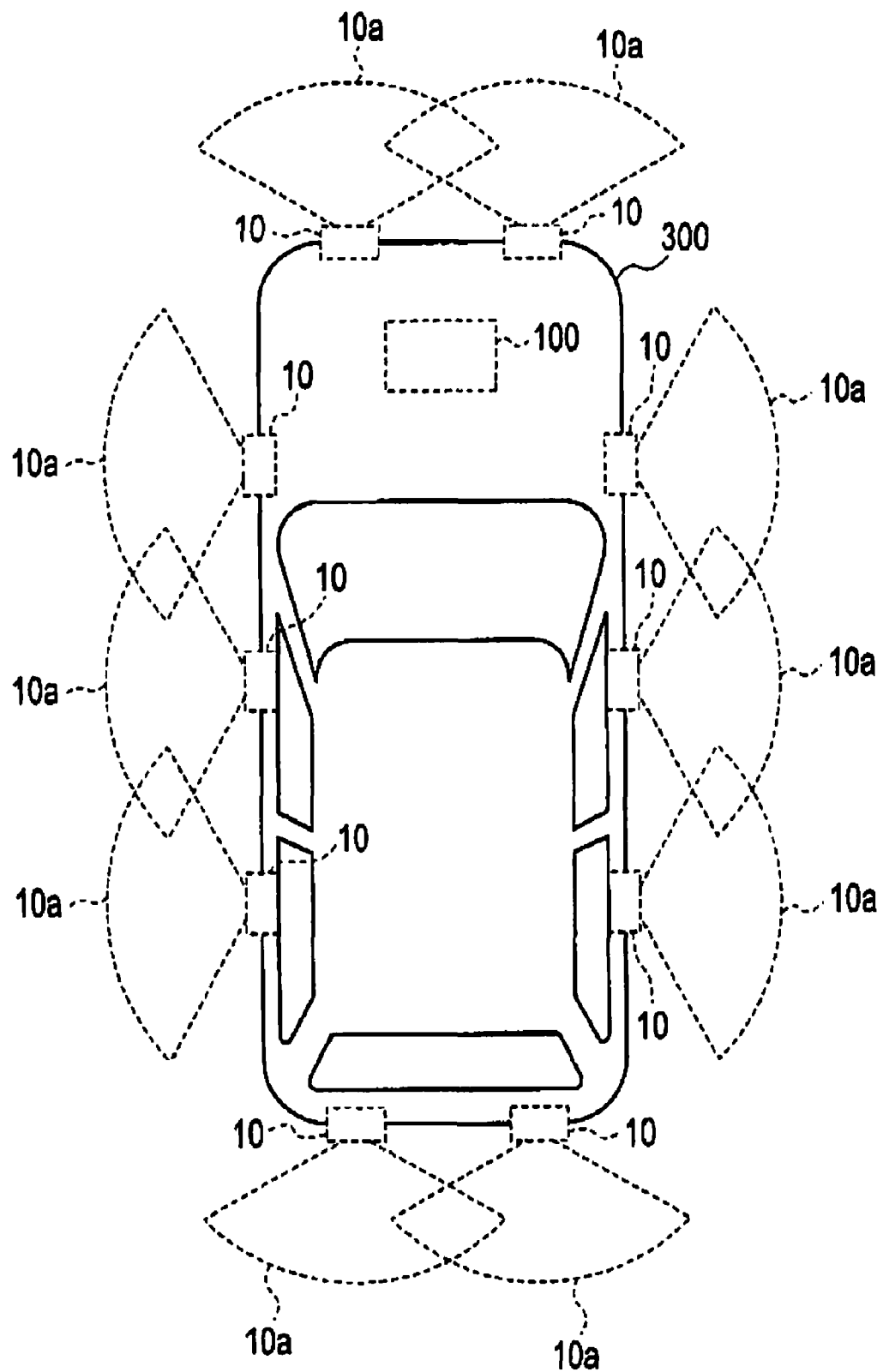
FIG. 3 is a view showing a vehicle according to the embodiment of the present invention.

As shown in FIG. 3, a plurality of cameras 10 and an image processor 100 are provided on a vehicle 800. The cameras 10 are provided on front parts, side parts, and rear parts of the vehicle 300. The cameras 10 provided on the front parts have imaging ranges 10a in a front direction of the vehicle 300. The cameras 10 provided on the side parts have imaging ranges 10a in side directions of the vehicle 300. The cameras 10 provided on the rear parts have imaging ranges 10a in a rear direction of the vehicle 300. However, positions of the cameras 10 may be arbitrarily changed, and the width and angle of each imaging range 10a may also be arbitrarily changed.

An image processor 100 is provided on an engine control unit (ECU) or the like of the vehicle 300. However, a position of the image processor 100 may be arbitrarily changed.

FIG. 4 shows an entire configuration of the driving assistance system 1 of the present invention. As shown in FIG. 4, the driving assistance system 1 of the present invention includes cameras 10_1 to 10_n, an image processor 100, and a display 200.

The cameras 10_1 to 10_n are provided on a vehicle, and take images surrounding the vehicle to obtain camera images. In this embodiment, descriptions will be given of the case where the driving assistance system 1 has two cameras, the cameras 10_1 and 10_2, as an example. However, the number of such cameras is not limited to two. In the descriptions of this embodiment, an image captured by the camera 10_1 is denoted by a camera image PRa, and an image captured by the camera 10_2 is denoted by a camera image PLa.

The image processor 100 is connected to the cameras 10_1 and 10_2. Further, the image processor 100 acquires the camera images PRa and PLa which are respectively captured by the cameras 10_1 and 10_2, and projects the received camera images PRa and PLa onto a flat surface and a cylindrical surface (a curved surface) to generate a display image Pe to be displayed on the display 200.

The display 200 is connected to the image processor 100. Further, the display 200 receives the display image Pe outputted from the image processor 100 to display the display image Pe for the driver. Here, as the display 200, a display panel provided in the vehicle, such as that of a car navigation system is assumed.

(Configuration of Image Processor)

Next, a configuration of the image processor 100 will be specifically described. Hereinafter, parts related to the present invention will be mainly described. Accordingly, it should be noted that the image processor 100 may possibly include some not illustrated or not described functional blocks which are essential for implementing functions as an image processor, such as a power unit.

Image processor 100 includes an acquisition unit 110, a composition unit 120, a detector 130, a mapping calculator 140, a mapping storage 150, and an image converter 160.

The acquisition unit 110 is connected to the cameras 10_1 and 10_2. In addition, the acquisition unit 110 serves as a memory for temporarily storing camera images. Specifically, the acquisition unit 110 acquires and stores a plurality of camera images PRa and PLa which are captured by the cameras 10_1 and 10_2 provided on the vehicle.

The composition unit 120 combines the plurality of camera images PRa and PLa acquired by the acquisition unit 110, and generates a composite image Pc. Specifically, upon receiving the camera images PRa and PLa from the acquisition unit 110, the composition unit 120 projects the received camera images PRa and PLa onto the common cylindrical surface by using Equations (1) and (2) below. Thereby the composition unit generates a cylindrical surface projection image PRb and a cylindrical surface projection image PLb. In Equations (1) and (2) below, coordinates on a camera image are represented by (x, y), and coordinates on a cylindrical surface are represented by (u, v). Further, a focal distance r to the cylindrical surface can be calculated using a ratio of an image size (width×height) to a CCD size.

[Equation 1]
$$u = r\theta = r\tan^{-1}\left(\frac{x}{r}\right) \quad (1)$$

[Equation 2]
$$v = \frac{r \times y}{\sqrt{x^2 + r^2}} \quad (2)$$

Figures 5A, 5B:
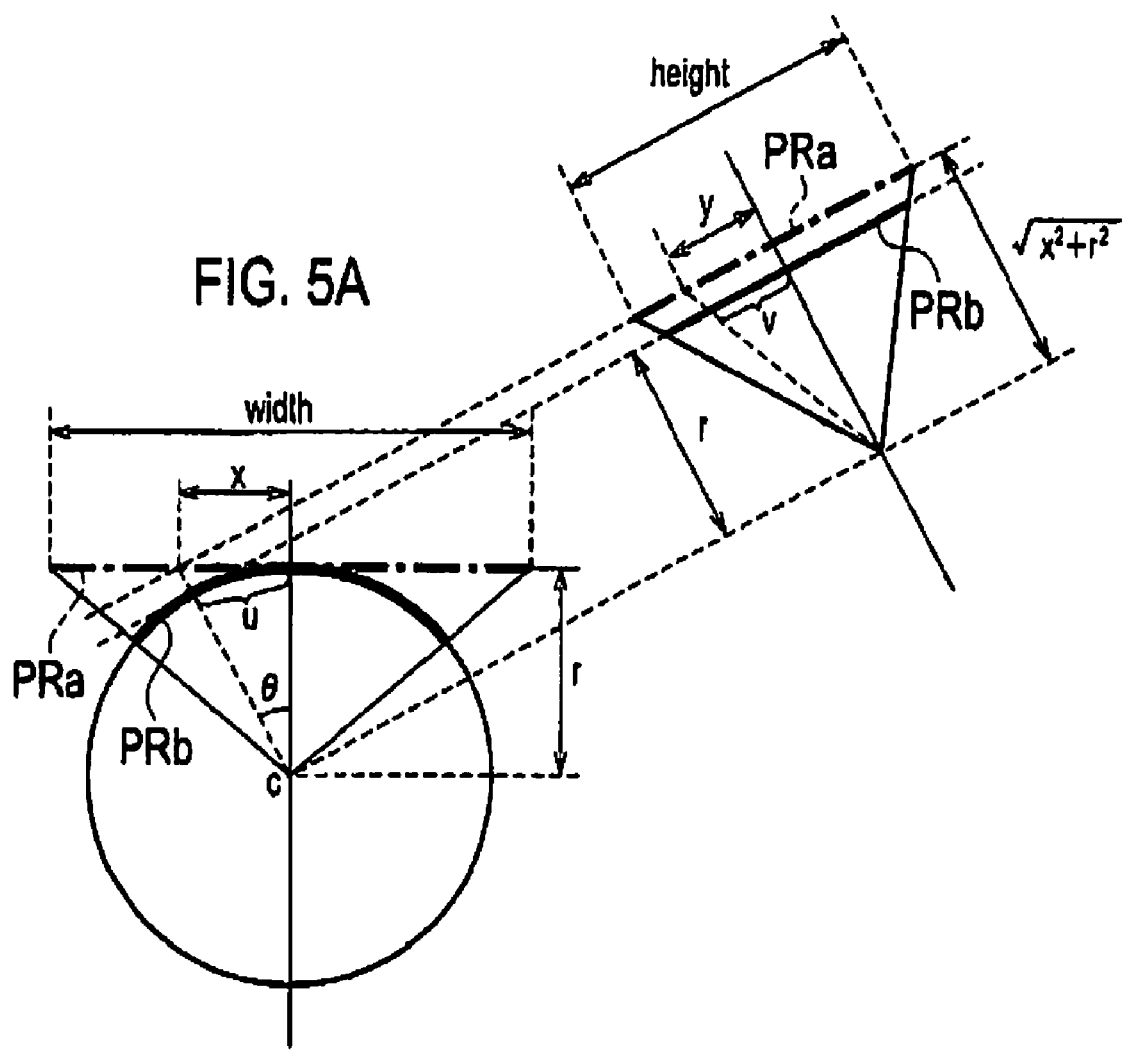
FIG. 5A is a cross-sectional image view of a camera image PRa and a cylindrical surface projection image PRb taken along a plane perpendicular to the central axis of a cylindrical surface in the embodiment of the present invention.
FIG. 5B is a cross-sectional image view of the camera image PRa and the cylindrical surface projection image PRb taken along a plane which intersects with the central axis of the cylindrical surface in the embodiment of the present invention.

FIGS. 5A and 5B show a concept that the composition unit 120 converts a single camera image PRa, for example, into a projection image PRb. Here, FIG. 5A shows a cross-sectional diagram of the camera image PRa and the cylindrical surface projection image PRb taken along a plane perpendicular to the central axis of a cylindrical surface. Further, FIG. 5B shows a cross-sectional diagram of the camera image PRa and the cylindrical surface projection image PRb taken at an angle θ along a plane which intersects the central axis of the cylindrical surface. The angle θ is a certain central angle subtending a part of the circumference of the cylindrical surface.

Figure 6A:
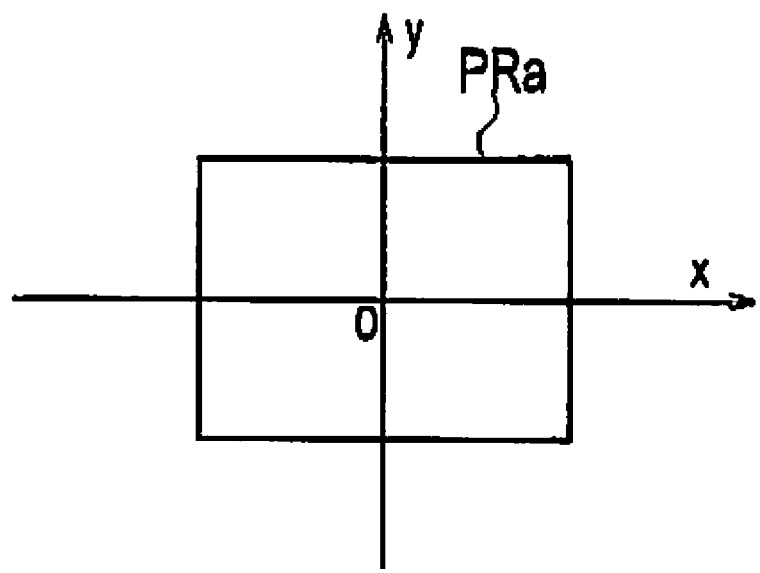
FIG. 6A is a view showing the camera image PRa on an x-y coordinate system with its center of the camera image PRa at the origin in the embodiment of the present invention.
Figure 6B:
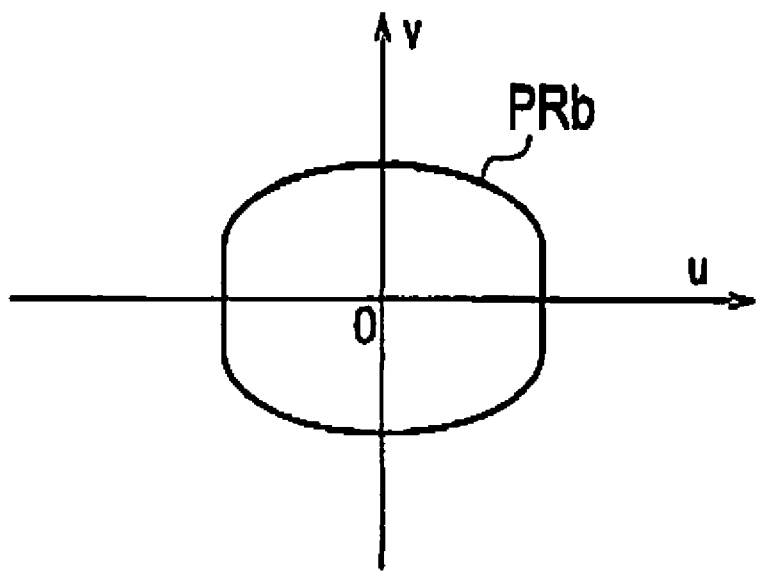
FIG. 6B is a view showing the cylindrical surface projection image PRb on an u-v coordinate system with its center of the cylindrical surface projection image PRb at the origin in the embodiment of the present invention.

As shown in FIGS. 5A and 5B, using Equations (1) and (2) above, the composition unit 120 projects the camera image PRa onto the cylindrical surface, to convert the camera image PRa into the cylindrical surface projection image PRb. Thus, for example, the camera image PRa on a x-y coordinate system with its center at the origin O shown in FIG. 6A is converted into the cylindrical surface projection image PRb on a u-v coordinate system with its center at the origin O shown in FIG. 6B.

In the same manner, the composition unit 120 also projects the camera image PLa onto the cylindrical surface to generate the cylindrical surface projection image PLb. Further, on the basis of respective shooting directions of the cameras 10_1 and 10_2, the composition unit 120 combines the cylindrical surface projection image PRb and the cylindrical surface projection image PLb on the same cylindrical surface, to generate a composite image Pc on a u'-v'system. Here, it is assumed that optical centers c of the cameras 10_1 and 10_2 agree with each other. This embodiment is described, as needed, where a width direction denotes a u' direction of the u'-v' coordinate system, and where a height direction denotes a v' direction thereof. In addition, the composition unit 120 outputs the generated composite image Pc to the image converter 160.

The detector 130 first detects a traveling direction of the vehicle. More specifically, the detector 130 detects a steering angle Hθ of a steering wheel of the vehicle, and detects whether the traveling direction of the vehicle is at an angle (+Hθ) in a left-turn direction, or at an angle (+Hθ) in a right turn direction. Here, the steering angle "0" means that the vehicle is traveling straight. Then, the detector 180 informs the mapping calculator 140 of the detected steering angle Hθ.

The mapping calculator 140 calculates a flat surface projection region and cylindrical surface projection regions within the composite image Pc. Further, upon informed of the steering angle Hθ from the detector 130, the mapping calculator 140 calculates a flat surface projection region based on the steering angle Hθ, and a flat surface projection width W (a predetermined width). The projection width W is stored in the mapping calculator in advance. Specifically, with a coordinate u'c of the u'-v' coordinate system corresponding to the informed steering angle Hθ set as a center, the mapping calculator 140 calculates coordinates of pixels in a region of −W|2<u'c<W|2 within the composite image Pc as coordinates on a flat surface projection region. Incidentally, in this embodiment, the following description will be given using "w" instead of "W|2" when needed.

In this embodiment, the flat surface projection width W corresponds to a width of the vehicle on the display image Pe to be displayed on the display 200. For example, suppose the case where each of the cameras 10_1 and 10_2 includes a ¼-inch imaging device and has a focal distance of 1.3 mm, and where the width of the vehicle is 2 m. In this case, the angle (=2Φ) corresponding to the flat surface projection width W can be determined as "126°." Here, the angle Φ is a half of the angle 2Φ, i.e., 63°. Accordingly, with the steering angle Hθ set as a center, a region corresponding to −63°(−Φ) <Hθ<63° (Φ) is defined as a region of −W|2<u'c<W|2.

In this manner, in accordance with the steering angle Hθ (the traveling direction) detected by the detector 130, the mapping calculator 140 shifts the position of the flat surface projection region within the composite image Pc in the width direction (u' direction), and calculates coordinates of the flat surface projection region.

Further, on the basis of the flat surface projection region thus calculated, the mapping calculator 140 calculates coordinates of cylindrical surface projection regions that are regions outside the flat surface projection region in the width direction within the composite image Pc. In addition, the mapping calculator 140 causes the mapping storage 150 to store the coordinates of the flat surface projection region on the cylindrical surface coordinate system and the coordinates of the cylindrical surface projection regions on the cylindrical surface coordinate system each of which calculated in the above described manner.

The mapping storage 160 stores the coordinates of the coordinates of the flat surface projection region and the coordinates of the cylindrical surface projection regions each of which calculated by the mapping calculator 140.

The image converter 160 projects a camera image onto a flat surface to convert the camera image into a flat surface projection image. Further, within the camera image, the image converter 160 converts a flat surface projection region (a first image region) having a flat surface projection width (a predetermined width) into a flat surface projection image.

Specifically, upon receipt of the composite image Pc from the composition unit 120, the image converter 160 reads coordinates of the flat surface projection region stored in the mapping storage 150. Thereafter, on the basis of the coordinates of the flat surface projection region thus read, the image converter 160 converts the flat surface projection region within the composite image Pc into a flat surface projection image Pd.

Incidentally, the coordinates of the flat surface projection region stored in the mapping storage 150 indicate a flat surface projection region shifted in the width direction in accordance with the steering angle Hθ (the traveling direction) by the mapping calculator 140. In other words, the image converter 160 performs the following processing of reading the coordinates of the flat surface projection region stored in the mapping storage 150, shifting the position of the flat surface projection region within the composite image Pc in the width direction in accordance with the steering angle Hθ detected by the detector 130; and then converting the image within the shifted flat surface projection region into a flat surface projection image Pd.

Further, the image converter 160 projects a camera image onto a cylindrical surface (a curved surface) to convert the camera image into a cylindrical surface projection image (a curved surface projection image). Further, the image converter 160 converts cylindrical surface projection regions (second image regions) that are regions outside the flat surface projection region in the width direction within the camera image, into cylindrical surface projection images.

Specifically, upon receipt of the composite image Pc from the composition unit 120, the image converter 160 reads coordinates of the cylindrical surface projection regions stored in the mapping storage 150. Thereafter, on the basis of the coordinates of the cylindrical surface projection regions thus read, the image converter 160 converts the cylindrical surface projection regions that are regions outside the flat surface projection region in the width direction within the composite image Pc, into cylindrical surface projection images.

In addition, after performing the conversions to obtain the flat surface projection image Pd and the cylindrical surface projection images, the image converter 160 generates a conversion projection image by compositing the flat surface projection image Pd and the cylindrical surface projection images.

Still further, from the conversion projection image thus generated, the image converter 160 extracts an image within a region G corresponding to a range to be displayed on the display 200, to generate the display image Pe. Thereafter the image converter 160 outputs the display image Pe to the display 200. Note that the image converter 160 of this embodiment functions as the first image converter, and also as the second image converter.

(Conversion into Projection Image)

Next, specific descriptions will be given of a calculation method used when the image converter 160 converts an image within a composite image Pc into a flat surface projection image and a cylindrical surface projection image.

The image converter 160 reads coordinates of a flat surface projection region and coordinates of cylindrical surface projection regions stored in the mapping storage 150, and inputs therein a composite image Pc from the composition unit 120. Further, the image converter 160 converts pixels in a region within −w<u'<w corresponding to the flat surface projection region, on coordinates (u', v') on the composite image Pc, into coordinates (x', y') on a flat surface projection image Pd based on Equations (3) and (4) below.

[Equation 3] (3)

$$x' = d\tan\phi = \sqrt{r^2 - s^2} \times \tan\phi = \sqrt{r^2 - \left(r\sin\left(\frac{w}{r}\right)\right)^2} \times \tan\left(\frac{u'}{r}\right)$$

[Equation 4] (4)

$$y' = \frac{v'r}{\sqrt{d^2 + x'^2}} = \frac{v'r}{\sqrt{r^2 - s^2 + x'^2}} = \frac{v'r}{\sqrt{r^2 - \left(r\sin\left(\frac{w}{r}\right)\right)^2 + x'^2}}$$

Here, FIG. 7A shows a cross-sectional diagram of a composite image Pc and a flat surface projection image Pd taken along a plane perpendicular to the central axis of a cylindrical surface. Further, FIG. 7B shows a cross-sectional diagram of the composite image Pc and the flat surface projection image Pd taken at an angle Φ along a surface which intersects the central axis of the cylindrical surface. The angle Φ is a certain central angle subtending a part of the circumference of the cylindrical surface. Meanwhile, in FIGS. 7A and 7B, the steering angle Hθ is assumed to be "0°."

Figure 8A:
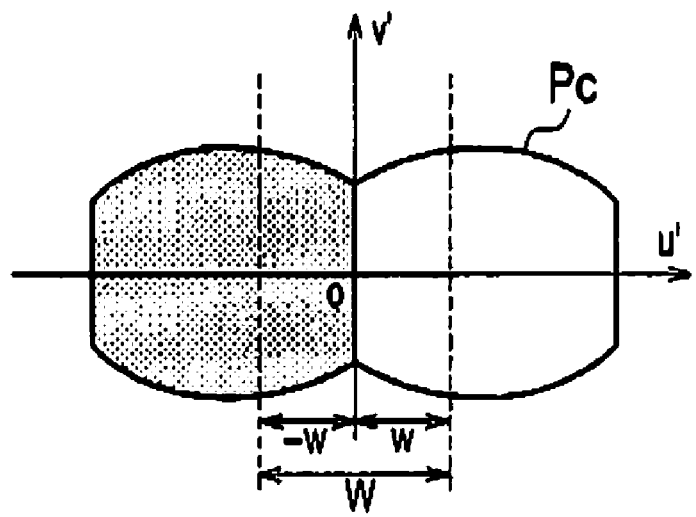
FIG. 8A is a view showing a composite image Pc on a u'-v' coordinate system in the embodiment of the present invention.
Figure 8B:
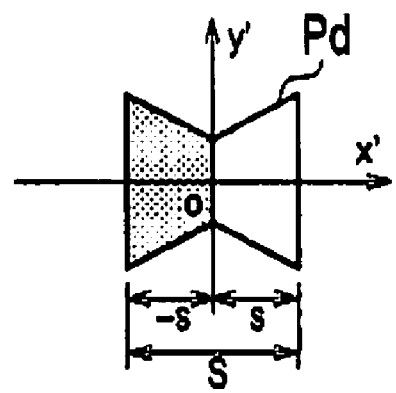
FIG. 8B is a view showing a flat surface projection image Pd on an x'-y' system in the embodiment of the present invention.
Figure 8C:
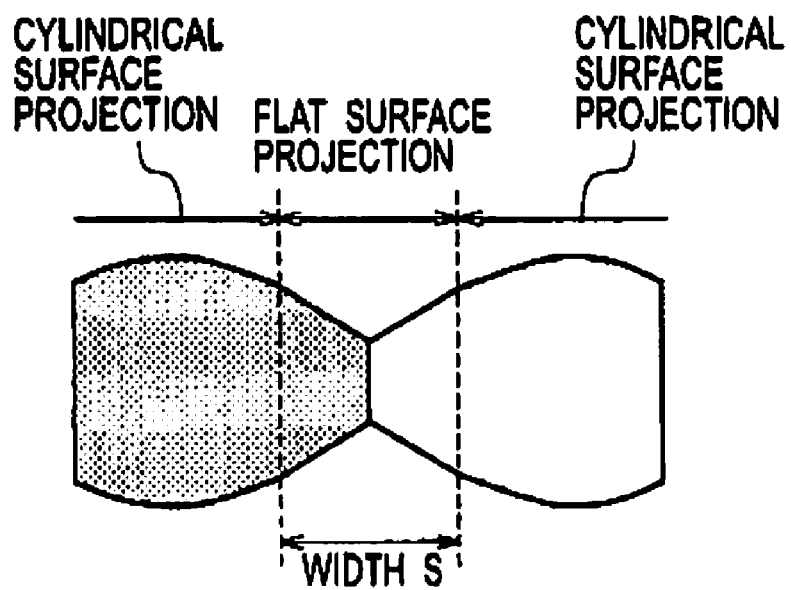
FIG. 8C is a view showing a conversion projection image of the embodiment of the present invention.

As shown in FIGS. 7A and 7B, the image converter 160 converts pixels in a region within $-w<u'<w$ on the composite image Pc into those in a region within $-s<x'<s$ on the flat surface projection image Pd. Specifically, the image converter 160 converts a flat surface projection region within $-w<u'<w$ on the composite image Pc of a u'-v' cylindrical surface coordinate system with its center at the origin O, shown in FIG. 8A, into a flat surface projection image Pd in a region within $-s<x'<s$ of an x'-y' flat surface coordinate system shown in FIG. 8B. Further, as shown in FIG. 8C, the image converter 160 generates a flat surface projection image by compositing the flat surface projection image Pd and the cylindrical surface projection images. At this time, a flat surface projection width W (=2w) shown in the u'-v' cylindrical surface coordinate system is represented by a flat surface projection width S (=2s) in the x'-y' plane coordinate system.

(Control Operation of Image Processor)

Figure 9:
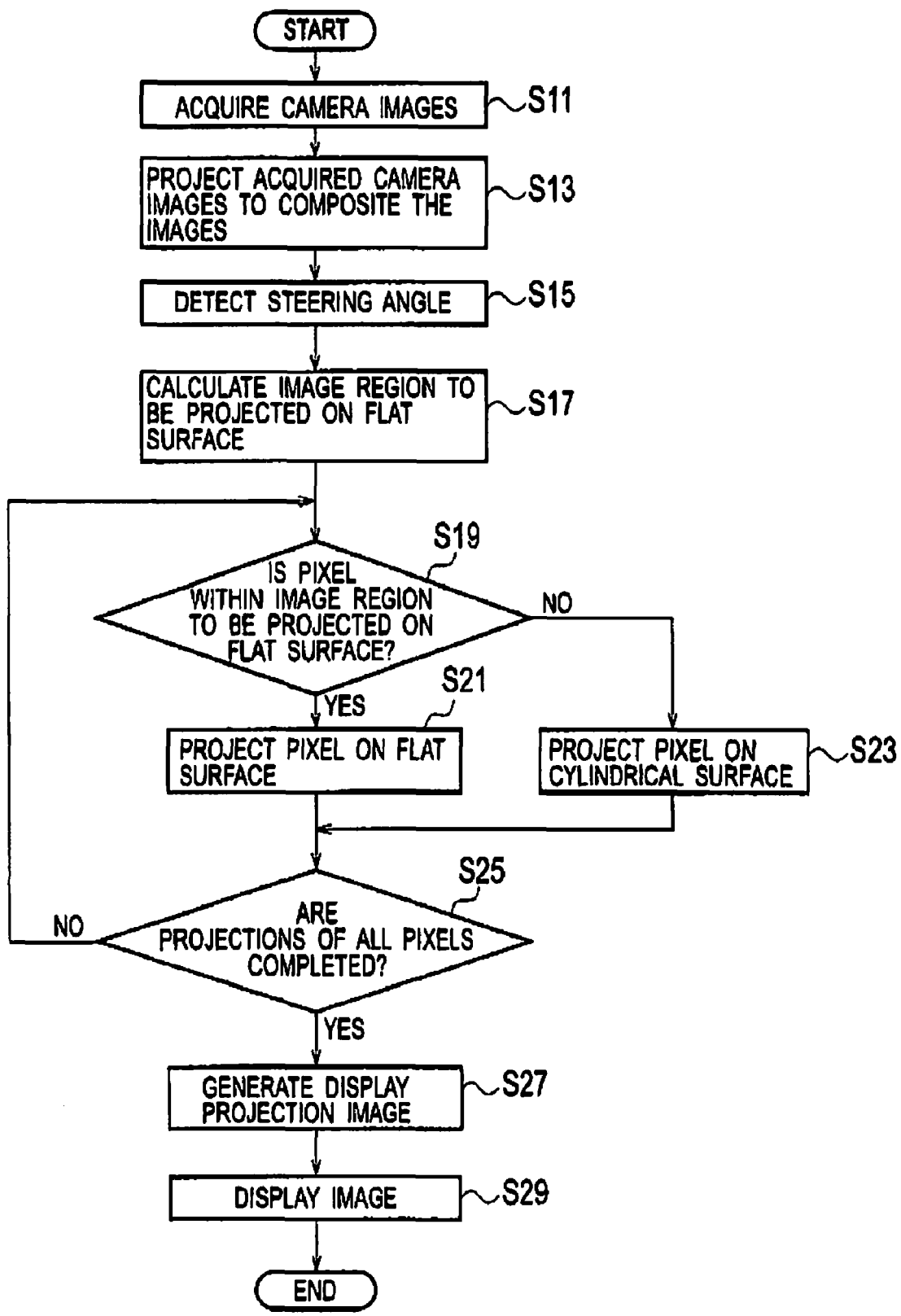
FIG. 9 is a flowchart showing operation of an image processor of the embodiment of the present invention.

Subsequently, operation of the image processor 100 will be described with reference to FIG. 9.

In Step S11, the acquisition unit 110 acquires camera images PRa and PLa from the cameras 10_1 and 10_2. The acquisition unit 110 outputs the camera images PRa and PLa to the composition unit 120.

In Step S13, the composition unit 120 first receives the camera images PRa and PLa from the acquisition unit 110. Then, the composition unit 120 projects the camera images PRa and PLa onto the common cylindrical surface to convert the camera images PRa and PLa into the cylindrical surface projection images PRb and PLb, respectively. Then, the composition unit 120 generates the composite image Pc by compositing the cylindrical surface projection images PRb and PLb. Finally, the composition unit 120 outputs the generated composite image Pc to the image converter 160.

In Step S15, the detector 130 acquires a steering angle Hθ from the steering wheel, and informs the mapping calculator 140 of the steering angle Hθ.

In Step S17, upon informed of the steering angle Hθ from the detector 130, the mapping calculator 140 calculates a flat surface projection region shifted in the width direction in accordance with the steering angle Hθ, within the composite image Pc. Specifically, with the steering angle Hθ set as a center, the mapping calculator 140 calculates a range of an angle corresponding to the flat surface projection width W of the flat surface projection image, and then calculates coordinates of the flat surface projection region ($-w<u'<w$) using the calculated range of the angle. At this time, the mapping calculator 140 calculates coordinates of regions (regions defined by $u'\leq-w$, and $w\leq u'$) outside the flat surface projection region ($-w<u'<w$) in the width direction as cylindrical surface projection regions. Finally, the mapping calculator 140 causes the mapping storage 150 to store the calculated coordinates of the flat surface projection region, and the calculated coordinates of the cylindrical surface projection regions.

In Step S19, upon receipt of the composite image Pc from the composition unit 120, the image converter 160 reads coordinates of the flat surface projection region and coordinates of the cylindrical surface projection regions stored in the mapping storage 150. Then, the image converter 160 specifies one pixel within the composite image Pc, and determines whether or not coordinates of the specified pixel is within the flat surface projection region.

When the image converter 160 determines that the coordinates the specified pixel is within the flat surface projection region, then the image converter 160 converts the specified pixel into a pixel on a flat surface projection region Pd in the x'y' flat surface coordinate system, in Step S21.

When the image converter 160 determines that the coordinates the specified pixel is not within the flat surface projection region, then the image converter 160 converts the specified pixel into a pixel on cylindrical surface projection images in the u'-v' cylindrical surface coordinate system, in Step S23. Specifically, the image converter 160 sets the pixel the composite image Pc on the cylindrical surface as a pixel on the cylindrical surface projection image, without change.

In Step S25, the image converter 160 determines whether or not conversions of all the pixels within the composite image Pc into either cylindrical surface projection images or flat surface projection images Pd have been completed. When the conversion of all the pixels is not completed, the image converter 160 repeats the operations of Steps S19 to S25.

When the image converter 160 determines that the conversions of all the pixels have been completed, the image converter 160 generates a conversion projection image in Step S27.

Here, each of FIG. 10A to 10C shows an example of a conversion projection image in the case where the cameras 10_1 and 10_2 are directed rearward of the vehicle as shown in FIG. 1. Specifically, FIG. 10A shows a conversion projection image at the time when the steering is turned right so that the vehicle moving backward is turned right seen from the driver. FIG. 10B shows a conversion projection image at the time when the steering is not turned so that the vehicle moving backward goes straight. FIG. 10C shows a conversion projection image at the time when the steering is turned left so that the vehicle moving backward is turned left seen from the driver.

As shown in FIGS. 10A to 10C, in converting the flat surface projection region into the flat surface projection image Pd, the image processor 100 shifts the flat surface projection region in the width direction on the basis of the steering angle Hθ. Accordingly, an eventually generated conversion projection image includes a flat surface projection image Pd whose position is varied in accordance with whether the vehicle turns left, goes straight, or turns right. Thus, on a flat surface projection image Pd within a conversion projection image, an object M such as a white line can be displayed as an image undistorted and highly visible to the driver. On the other hand, on the cylindrical surface projection image, the object M such as a white line is displayed as a distorted image, but a wider view around the vehicle is displayed.

Figure 11A:
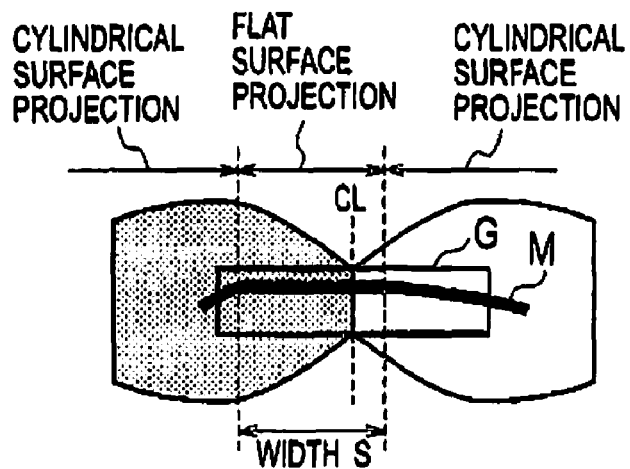
FIG. 11A is a view showing an example of a region corresponding to a display range within a conversion projection image in the embodiment of the present invention.
Figure 11B:
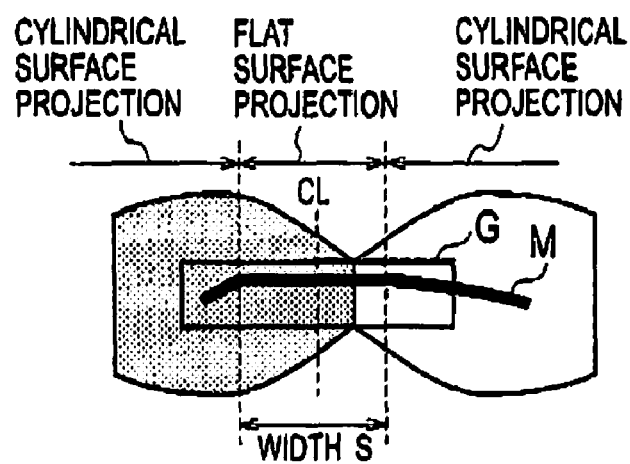
FIG. 11B is a view showing an example of a region corresponding to a display range within a conversion projection image in the embodiment of the present invention.

The image converter 160 extracts, from the conversion projection image, a region G corresponding to a display range of the display 200 and generates a display image Pe. At this time, for example, as shown in FIG. 11A, the image converter 160 may generate the display image Pe by positioning the region G corresponding to the display region in a manner of adjusting the center line CL of the region G to the center of the composite image Pc. Alternatively, as shown in FIG. 11B, the image converter 160 may generate the display image Pe by adjusting the center line CL of the region G to the center of the flat surface projection image Pd to be shifted in the width direction. Finally, the image converter 160 outputs the generated display image Pe to the display 200.

In Step S29, the display image outputted from the image converter 160 is displayed on the display 200.

(Advantages)

According to the driving assistance system 1 of this embodiment, within a composite image Pc combined by projecting the camera images PRa and PLa onto a flat surface and a cylindrical surface, the image processor 100 converts a flat surface projection region having a flat surface projection width (a predetermined width) into a flat surface projection image, and converts regions outside the flat surface projection region, that are cylindrical surface projection regions, into cylindrical surface projection images. Accordingly, the image processor 100 can cause the display 200 to display a display projection image Pe having together a flat surface projection image Pd, which is close to an image actually viewed by the driver with eyes, and cylindrical surface projection images in a wide field of view. Therefore, the image processor 100 of this embodiment is capable of preventing a degradation of visibility of an image to be displayed by using the flat surface projection image, and providing a converted image in a wide field of view by using the cylindrical surface projection images.

Further, the image processor 100 converts a flat surface projection region having a flat surface projection width W (a width S in a plane coordinate system) corresponding to the vehicle width into a flat surface projection image Pd. Accordingly, the converted display image Pe makes it possible for the driver to easily check a situation around the vehicle width to which attention should be paid while driving.

Still further, the image processor 100 shifts a flat surface projection image Pd in the width direction of the vehicle, by shifting a flat surface projection region in accordance with the traveling direction of the vehicle. Accordingly the converted display image Pe makes it possible for the driver to easily check a situation in the traveling direction of the vehicle to which attention should be paid while driving, even when the vehicle turns left or turns right.

Modification of First Embodiment

A configuration of a modification of the image processor 100 of the aforementioned embodiment will be described below focusing on the differences from the aforementioned image processor 100. A configuration of the image processor 100 of this modification is the same as that of the image processor 100 of the aforementioned embodiment, except the mapping calculator 140 and the image converter 160. Therefore, configurations of the mapping calculator 140 and the image converter 160 of this modification will be described below.

The mapping calculator 140 is configured to set a flat surface projection width (a predetermined width). Specifically, for example, in receiving a steering angle Hθ according to a right turn of the vehicle from the detector 130, the mapping calculator 140 sets a value of a flat surface projection width to, for example, W+α in accordance with the steering angle Hθ. The width of W+α is obtained by expanding the flat surface projection width W into the right-turn direction, which is the traveling direction of the vehicle. Then, the mapping calculator 140 calculates coordinates of a flat surface projection region with the width of the flat surface projection region set as W+α, and causes the mapping storage 150 to store the calculated coordinates. Incidentally, in this embodiment, the mapping calculator 140 configures a setting unit to set a predetermined width.

Further, the image converter 160 converts the flat surface projection region into a flat surface projection image Pd in accordance with the flat surface projection width W+α set by the mapping calculator 140. Specifically, the image converter 160 reads coordinates of a flat surface projection region stored in the mapping storage 150, and converts an image of the flat surface projection region within a composite image Pc into a flat surface projection image Pd.

Figure 12:
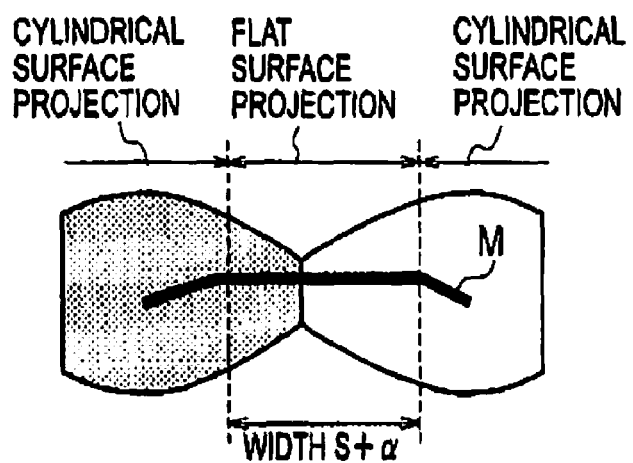
FIG. 12 is a view showing an example in the case where a width of a conversion projection image is changed in the embodiment of the present invention.

In this way, for example, when the vehicle traveling back turns right of the traveling direction, as shown in FIG. 12, the image converter 160 generates a conversion projection image in which a flat surface projection image Pd extends in the traveling direction side (right side) to be wider than the width S by α. In the same fashion, when the vehicle traveling back turns left, the image converter 160 generates a conversion projection image in which a flat surface projection image Pd extends in the traveling direction side (left side) to be wider than the width S by α.

The mapping calculator 140 according to the aforementioned modification sets a flat surface projection width changed in accordance with whether the vehicle turns left or right. Accordingly, the mapping calculator 140 can provide an image of a region in which a vehicle may possibly have a minor collision in the traveling direction of the vehicle, as an image highly visible for the driver.

In addition, the mapping calculator 140 may be configured to set, for example, a width W inputted by the driver (a user) with an input unit (not shown), as a flat surface projection width W. It is also possible to change the reference flat surface projection width at the time when the vehicle is traveling straight in accordance with a driver's preference.

Further, the mapping calculator 140 may include a function for detecting a traveling speed of a vehicle to be configured to widen or narrow the flat surface projection width W in accordance with a detected traveling speed. Specifically, when the speed is high (e.g., 100 km/h), the mapping calculator 140 may narrow the flat surface projection width W and widen cylindrical surface projection regions so that the driver can watch in a wider field of view. On the other hand, when the speed is low, the mapping calculator 140 may widen the flat surface projection width W and narrow the cylindrical surface projection regions so that the driver can watch distances between the vehicle and surrounding objects more carefully.

Other Embodiment

As described above, although the present invention has been disclosed according to the embodiment of the present invention, it should be understood that the present invention is not limited by the description and the accompanying drawings constituting part of the disclosure. According to the disclosure, various other alternative embodiments will be apparent to s those skilled in the art.

In the aforementioned embodiment, the image converter 160 is configured to first composite a plurality of camera images PRa and PLa to obtain a composite image Pc, and to then convert a flat surface projection region in the composite image Pc, into a flat surface projection image Pd, and cylindrical surface projection regions therein into cylindrical surface projection images. However, the image converter 160 can convert a single camera image into a flat surface projection image and cylindrical surface projection images.

For example, when a single camera image is used, the image converter 160 acquires the single camera image from the acquisition unit 110 via the composition unit 120, and projects a flat surface projection region within the single camera image onto a flat surface to convert the flat surface projection region into a flat surface projection image Pd on an x'y' plane coordinate system. Further, the image converter 160 projects cylindrical surface projection regions within the camera image onto a cylindrical surface (a curved surface) on a u'-v' cylindrical surface coordinate system to convert the cylindrical surface projection regions into curved surface projection images.

Specifically, the image converter 160 first acquires a single camera image from the acquisition unit 110. At this time, referring to the mapping storage 150, the image converter 160 projects a flat surface projection region (a first image region)

having a flat surface projection width (a predetermined width), within the camera image, onto a flat surface to convert the flat surface projection region into a flat surface projection image Pd. Further, the image converter 160 converts cylindrical surface projection regions (second image regions) that are regions outside the flat surface projection region in the width direction, within the camera image, into cylindrical surface projection images (curved surface projection images). Then, the image converter 160 generates a conversion projection image by compositing the flat surface projection image and the cylindrical surface projection images thus converted. Finally, the image converter 160 extracts a region G corresponding to a display range of the display 200, from the conversion projection image to generate a display image Pe.

In this way, irrespective of whether the number of camera images is one or plural, the image processor 100 generates a conversion projection image by compositing a flat surface projection image converted from a flat surface projection region having a flat surface projection width W, and cylindrical surface projection images converted from regions outside the flat surface projection region in the width direction.

Further, the image processor 100 of the aforementioned embodiment includes the detector 130, but may not include the detector 130. For example, the mapping calculator 140 may cause the mapping storage 150 to store coordinates of a flat surface projection region on a specified position instead of shifting the flat surface projection region in accordance with the traveling direction of the vehicle. In this case, on the basis of coordinates of a flat surface projection region without shifted in the width direction, the image converter 160 converts an image within a composite image Pc into a flat surface projection image Pd, but yet a display image Pe can be generated by compositing the flat surface projection image Pd and cylindrical surface projection images. Thus, in this configuration as well, the image processor 100 is capable of preventing a degradation of visibility of an image to be displayed by using the flat surface projection image, and capable of providing a converted display image Pe in a wide field of view by using the cylindrical surface projection images.

The driving assistance system 1 of the foregoing embodiment has been described with the example in which the cameras 10_1 and 10_2 capture images in a region rearward of a vehicle. However, the driving assistance system 1 may be configured to capture images in regions in the front direction and in the lateral directions (side directions) of the vehicle.

Further, in the driving assistance system 1, the cameras 10_1 and 10_2 usually use wide-angle lenses, so a captured camera image is largely distorted. Thus, the captured camera image must be subjected to distortion correction before being converted into a projection image. Accordingly, in the image processor 100, the acquisition unit 110 may be configured to correct such a distortion upon acquiring images from the cameras 10_1 and 10_2.

As described above, the present invention naturally includes various other embodiments not described above. Therefore, the scope of the present invention is defined only by the specific matters according to the scope of claims reasonable based on the foregoing description.

What is claimed is:

1. An image processor, comprising:
an acquisition unit configured to acquire a camera image captured by a camera provided on a vehicle;
a first image converter configured to project the camera image onto a flat surface to convert the camera image into a flat surface projection image; and
a second image converter configured to project the camera image onto a curved surface to convert the camera image into a curved surface projection image, wherein
the first image converter converts a first image region having a predetermined width within the camera image into the flat surface projection image, and
the second image converter converts a second image region which is region outside the first image region in a width direction, within the camera image, into the curved surface projection image.

2. The image processor according to claim 1, further comprising a composition unit configured to combine a plurality of camera images and to generate a composite image, wherein
the acquisition unit acquires the plurality of camera images;
the first image converter converts the first image region within the composite image into the flat surface projection image; and
the second image converter converts the second image region within the—composite image into the curved surface projection images.

3. The image processor according to claim 1, wherein the predetermined width corresponds to the width of the vehicle.

4. The image processor according to claim 1, further comprising a detector configured to detect a traveling direction of the vehicle, wherein
the first image converter shifts a position of the first image region within the camera image in a width direction in accordance with the detected traveling direction.

5. The image processor according to claim 1, further comprising a setting unit configured to set the predetermined width, wherein
the first image converter converts the first image region having the predetermined width set by the setting unit, into the flat surface projection image.

6. A vehicle comprising a camera and an image processor, wherein the image processor includes:
an acquisition unit configured to acquire a camera image captured by the camera;
a first image converter configured to project the camera image onto a flat surface to convert the camera image into a flat surface projection image; and
a second image converter configured to project the camera image onto a curved surface to convert the camera image into a curved surface projection image, and wherein
the first image converter converts a first image region having a predetermined width within the camera image into the flat surface projection image, and
the second image converter converts a second image region which is region outside the first image region in a width direction, within the camera image, into the curved surface projection image.

7. An image processing method comprising the steps of:
acquiring a camera image captured by a camera provided on a vehicle;
projecting the camera image onto a flat surface to convert the camera image into a flat surface projection image; and
projecting the camera image onto a curved surface to convert the camera image into a curved surface projection image, wherein
a first image region having a predetermined width within the camera image is converted into the flat surface projection image, and
a second image region which is region outside the first image region in a width direction within the camera image is converted into the curved surface projection image.

* * * * *